United States Patent [19]

Burge

[11] 4,335,908
[45] Jun. 22, 1982

[54] PUSH-IN TUBE CONNECTOR

[76] Inventor: Donald G. Burge, 10320 Douglas Ave., Rte. 1, Plainwell, Mich. 49080

[21] Appl. No.: 150,761

[22] Filed: May 19, 1980

[51] Int. Cl.³ .............................................. F16L 33/20
[52] U.S. Cl. ................................... 285/250; 285/323; 285/356
[58] Field of Search ............ 285/250, 249, 323, 382.7, 285/356 (U.S. only), 248, 105, 342, 104

[56] References Cited

U.S. PATENT DOCUMENTS

| 3,552,781 | 1/1971 | Helland | 285/356 X |
| 3,756,632 | 9/1973 | Riggs et al. | 285/250 |
| 4,062,572 | 12/1977 | Davis | 285/249 X |
| 4,188,051 | 2/1980 | Burge | 285/249 X |
| 4,220,359 | 9/1980 | Evenson et al. | 285/249 |

FOREIGN PATENT DOCUMENTS

| 2916900 | 11/1979 | Fed. Rep. of Germany | 285/104 |
| 1024537 | 3/1966 | United Kingdom | 285/105 |
| 1072872 | 6/1967 | United Kingdom | 285/323 |
| 2002079 | 2/1979 | United Kingdom | 285/249 |

*Primary Examiner*—Thomas F. Callaghan
*Attorney, Agent, or Firm*—Charles W. Chandler

[57] ABSTRACT

A quick connect fitting for air brake tubing consists of a body member with a tubing support therein and a nut threadedly connected to the body. A split ring gripping sleeve having a conical outer surface cooperates with the conical inner surface of the nut to receive and retain inserted tubing. A ring seal is disposed in the body member to provide a primary seal between the body and nut and includes a surface in engagement with the gripping sleeve to maintain alignment of same with the conical surface, limit the inward movement of the sleeve and bias the sleeve toward the conical surface to enhance the grip. In various embodiments of the invention the ring seal provides a primary seal on the O.D. of the tubing or it abuts the end of the inserted tubing, in both instances providing an increased force to return the split ring tight to the conical surface of the nut. An o-ring in the nut provides a seal on the O.D. of the tubing in all embodiments of the invention and a metal-to-metal further seal is provided between body and nut external of the threads therebetween. Disconnection is achieved by unthreading the nut from the body.

12 Claims, 7 Drawing Figures

PUSH-IN TUBE CONNECTOR

BACKGROUND OF THE INVENTION

Push-in tube connectors are well-known in the art wherein a preassembled fitting is employed into which the tube end is inserted with no further operation required for making the joint tight and leakproof. Such type connector finds particular use in assembly line operations, for example where tubing is being installed on truck air brake systems and the like.

Prior art devices of this type are exemplified for example in U.S. Pat. No. 4,188,051 wherein the general combination of components comprising a body and nut member, an elastomeric sealing ring and a collet type gripping element are employed to provide a fluid-tight seal upon insertion of tubing and a firm grip thereon to prevent withdrawal of same. Disconnection of such type coupling is made by unthreading the nut from the body member whereby the tubing and the internal components of the coupling can be withdrawn.

Another example of fitting employing similar components is shown in U.S. Pat. No. 4,062,572, this however being not of the strict push-in type, but rather requiring a final tightening of an exterior nut once the tubing is in position within the fitting to trap the gripper ring and establish a preferred compression of the elastomeric sealing member. Disconnection of this type fitting is also achieved by unthreading the nut.

This prior art exemplifies difficulties in fittings of these types. In the push-in variety sufficient axial play must be afforded to the internal components of the fitting since relative movement must occur between the conical surfaces of the gripper member and its conical seating surface to allow for radial expansion and contraction thereof. With the components loosely assembled in the fitting in such manner, there occurs the possibility of cocking of the gripper sleeve, for example, unless means are provided to maintain alignment. Further, such axial end play may affect the sealing characteristics of the elastomeric seal as pulsations are encountered in fluidpower systems causing movement of the components in the fitting and further the possibility of weakening of the wall of the tubing can occur due to the play allowed. It is noted in various of these prior art embodiments that backup or secondary seals are provided between body and nut members to assure fluid tight connections.

While perhaps a more reliable seal can be effected in the type of fitting disclosed in U.S. Pat. No. 4,062,572 in that a controlled compression can be made to occur in the elastomeric seal and end play reduced or eliminated, such fitting is difficult to use in requiring the manual tightening of the nut portion thereon after the tubing has been inserted in the fitting.

SUMMARY OF THE INVENTION

In accordance with the present invention a push-in tube connector is provided wherein the components of the connector are preassembled and the tube then inserted to provide a tight leakproof joint. The connector consists of a body member having a nut threadedly engaged therewith with adjacent surfaces providing a metal-to-metal seal and a predetermined interfit of the body and the nut members. An elastomeric ring type seal is contained within the body members and provides a fluid seal between portions thereof, being compressed a predetermined amount by the predetermined physical spacing of the portions of the nut and body member. A split ring gripper with conical outer surface cooperates with the conical inner surface of the nut to provide radial expansion and contraction and a grip upon the outer surface of the inserted tubing to prevent withdrawal. An inner edge of the gripper member is designed to engage a ridge portion of the elastomeric seal to provide the plural functions of maintaining alignment of the gripper member with the conical surface to prevent cocking of same therein, effecting a stop for axial movement of the gripper member upon insertion of the tubing, and providing a bias upon the gripper member to urge same back toward the conical surface and into the radially contracted condition.

In all embodiments of the invention the elastomeric seal is further contacted by the inserted tubing and compressed a predetermined amount to enhance the seal between the body members and the bias upon the gripper member, in one embodiment providing a radial surface for abutment by the end of the inserted tubing and in another embodiment providing an annular surface for sealing the O.D. of the inserted tubing between the end thereof and the location of the gripper member. In all embodiments of the invention a further o-ring seal is employed in the nut external of the gripper while a tubular insert supports the tubing at the locations of the elastomeric seal, the gripper member and the o-ring seal.

BRIEF DESCRIPTION OF THE DRAWINGS

FIGS. 4A–5A are views of the connectors of FIGS. 4–5 with tubing inserted.

DETAILED DESCRIPTION OF THE DRAWINGS

Figure 1:
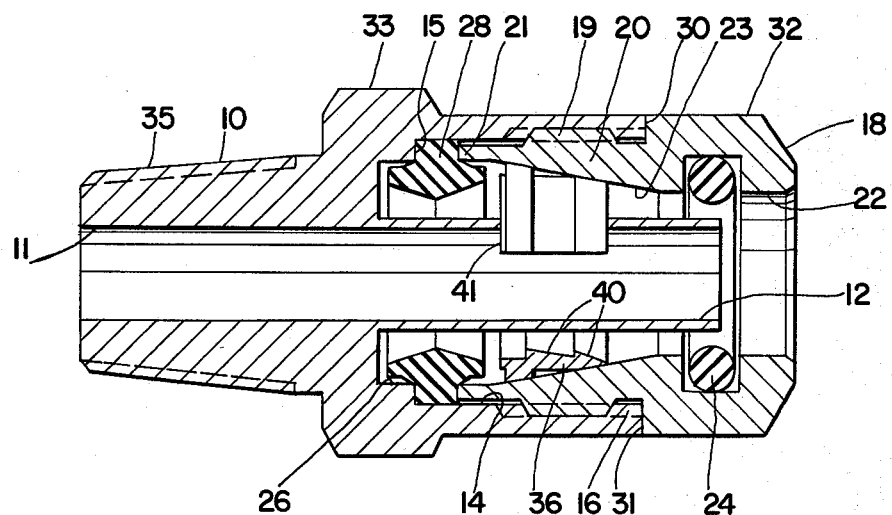
FIG. 1 is a longitudinal cross-section view of the preferred embodiment of connector.
Figure 2:
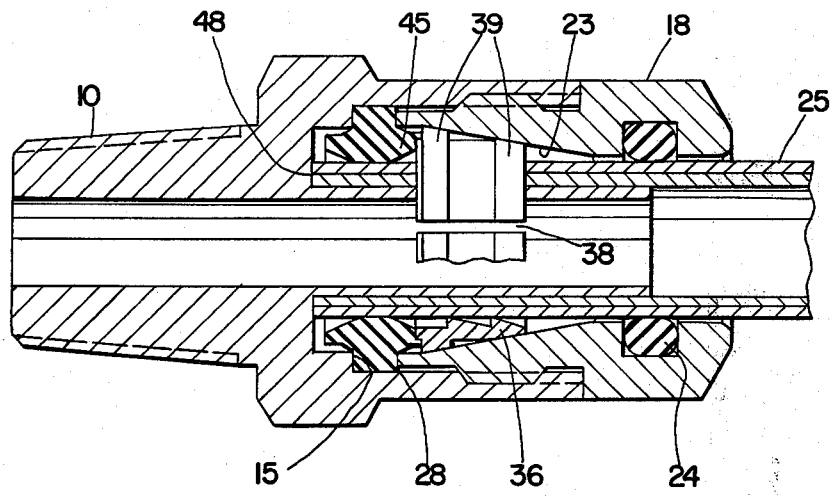
FIG. 2 is a view of the connector of FIG. 1 with tubing inserted.
Figure 3:
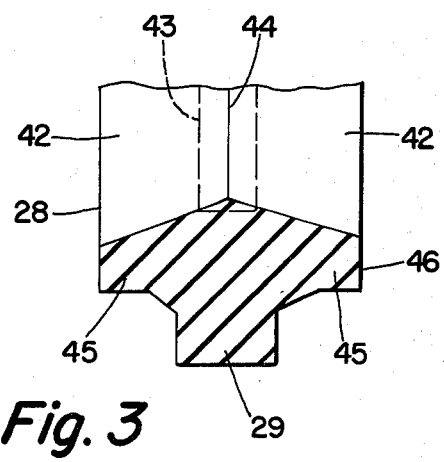
FIG. 3 is an enlarged partial section view of the ring seal portion of FIG. 1.

Referring initially to FIGS. 1–3, the connector of the invention comprises a body 10 having a flow passage 11 therein and an integral tube support 12, machined as a tubular member co-extensive with the flow passage 11. The body 10 includes a main bore 14 having radial shoulder 15 at the inner end thereof and includes internal threads 16 over a portion of the surface forming the bore 14.

The nut 18 includes external threads 19 formed on a generally tubular portion 20 thereof extending within the body 10 and terminating in an axially extending end ring 21. The nut 18 has an entrance bore 22 and a frustro-conical inner surface 23 in the tubular portion 20 thereof between the end ring 21 and entrance bore 22. An o-ring seal 24 is disposed in the entrance bore 22 for sealing against the O.D. of inserted tubing 25.

Shoulder 15 extends radially inwardly a short distance and intersects with recess bore 26 forming a part also of the tubing support 12. A ring seal 28 is disposed in the body 10, the ring seal 28 having a base portion 29 in engagement with shoulder 15, the main bore 14 and end ring 21 of nut 18 and placed in compression by the latter. The base portion 29 is generally rectangular in crosssectional configuration and is compressed a predetermined amount upon threading of the nut 18 into the body 10, the predetermined position of the end ring 21 being determined by the metal-to-metal abutment of radial surfaces 30, 31 on the body 10 and nut 18 respectively. Radial surface 30 is the annular entrance of body 10 and surface 31 is a shoulder on nut 18 adjacent wrench engaging flats 32. Further wrench flats 33 are provided on body 10 as are external pipe threads 35, for example, for engagement of the connector with external fluid devices.

The connector assembly further includes a gripper 36 therein consisting of a ring having an axial split 38 therein, a pair of axially spaced frusto-conical external surfaces 39 and a pair of annular ribs 40 on the inner surface thereof of ramp-like configuration having barbs thereon directed toward the inside of the connector. A still further annular ridge 41 is integral with and extends axially inwardly of the gripper 36, being slightly radially inwardly of the inner conical surface 39 and extending a short distance axially. Ring seal 28 further comprises a pair of inner conical surfaces 42 merging at an annular ridge or sealing surface 44, this being essentially a line contact surface in the uncoupled configuration of the fitting as depicted in FIG. 1 but comprising a substantial sealing surface for the O.D. of the inserted tubing 25, when compressed into sealing engagement thereby, as depicted in FIG. 2 and as shown by the dashed lines 43 in FIG. 3. The conical surfaces 42 of the ring seal 28 extend axially beyond base portion 29 forming inner and outer projecting flanges or rings 45 terminating in a substantially radial abutment face 46. Abutment face 46 is arranged radially inwardly of bore 14 and of sufficient radial dimension as to be engaged by annular ridge 41 of gripper 36 as the gripper is radially expanded and contracted upon movement relative to the inner surface of nut 18.

Thus it may be seen that upon insertion of tubing 25 into the connector an initial guiding thereof occurs by means of bore 22 of nut 18 such that the tubing is guided onto tube support 12. In further inward movement, tubing 25 will engage gripper 36 and slide same inwardly relative to the inner conical surface 23 of nut 18 until engagement between annular ridge 41 of gripper 36 and projecting flange 45 of ring seal 28 occurs. Such engagement between the gripper 36 and ring seal 28 maintains alignment of the gripper within the conical surface 23 and prevents cocking of same. Even though the gripper 36 is moved to an axial position within the nut 18 where it is free to be radially expanded, the dimensions of gripper 36 are such that the inner ribs 40 thereof are of a smaller diameter than the O.D. of tubing 25 providing an interference fit and requiring a substantial amount of force to radially expand the gripper 36. Typically the body 10, nut 18 and gripper 36 are machined of brass, but it will be apparent that other materials could be used as well.

The projecting flange 45 of ring seal 28 is compressed by ridge 41 to create additional bias to thus provide a stop device for resisting axially inward movement of the gripper 36. In this way the end 48 of the inserted tubing 25 may act upon the ramp surface of the inner ribs 40 of the gripper 36, camming the latter to a radially expanded condition. When the gripper 36 is sufficiently expanded the inserted tubing 25 can continue its transit along the tube support 12 passing within the ring seal 28, compressing same in deforming the annular line contact 44 thereof until abutment occurs between the tubing end 48 and the end wall of recess 26.

In compression of elastomeric seal 28 by means of abutment with gripper 36 and further compression afforded by means of inserted tubing 25, projecting flange 45 will bias the gripper 36 outwardly toward the inner conical surface 23 of nut 18 to a position where the gripper 36 becomes radially contracted upon the O.D. to tubing 25, this occurring to a great extent even while continued insertion force is applied to tubing 25 in the inward direction, thereby setting the ribs 40 well into the surface of tubing 25.

It will be clear then as seen in the coupled configuration of FIG. 2, with tubing 25 fully inserted within the connector, that the projecting flange 45 of ring seal 28 is in engagement with annular ridge 41 of the gripper 36, biasing the latter into conical surface 23 of nut 18, and that no axial end play occurs between these components of the connector. Additional outward force upon the tubing 25 as by the development of fluid pressure within the flow passage 11 or external pull on the tubing 25, then further merely tends to move the gripper 36 into a more radially contracted condition in relation to the conical surface 23 of the nut 18, thereby further increasing the grip upon tubing 25. It is apparent that gripper 36 and ring seal 28 may be sized in various ways to achieve different desired relationships of axial end play within the connector and that tubing 25 tolerances and manufacturing tolerances of the components of the connector itself will have an influence on these spacings but can be accommodated by proper design. I is desirable to so size the flange 45 of ring seal 28 and the annular ridge 41 such that the two remain in contact after the tubing 25 has been inserted in any position of the gripper 36 relative to the inner conical surface 23 of nut 18. Spacing may be allowed however, prior to insertion of tubing 25, as seen in FIG. 1, as desired.

It is noted as well that tube support 12 is axially sized to extend fully through ring seal 28, gripper member 36 and sufficiently close to o-ring 24 as to provide support for tubing 25 in these locations. With respect to more flexible plastic tubing 25, for example, tube support 12 substantially increases the sealing effect of ring seal 28 and gripping effectiveness of gripper member 36, while a close fit within bore 22 prevents undue flexing of tubing 25 adjacent the nut 18.

Thus it may be seen that a primary fluid seal for the fluid joint is provided by ring seal 28 in this embodiment of the invention on the O.D. of the tubing 25, and that a secondary seal to prevent leakage from internal pressure is provided by o-ring 24, again on the O.D. of the tubing 25, this seal also acting as a primary seal to keep out dirt and moisture from the connector. A body seal is effected by ring seal 29 between body 10 and nut 18 at inner ring 21, while a backup metal-to-metal seal is provided at the radial surfaces 30, 31.

Figure 4:
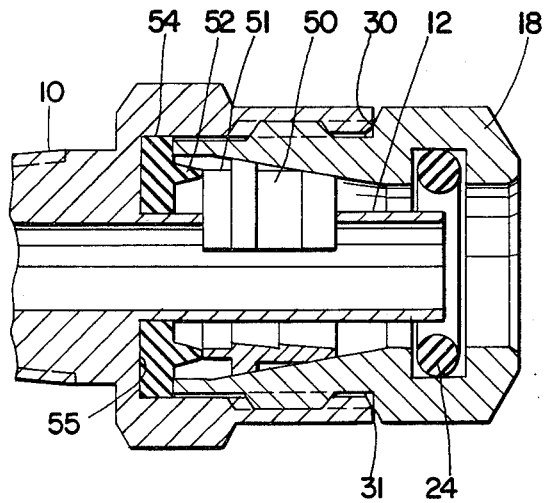
FIGS. 4–5 are partial longitudinal cross-section views of different embodiments of the invention.
Figure 4A:
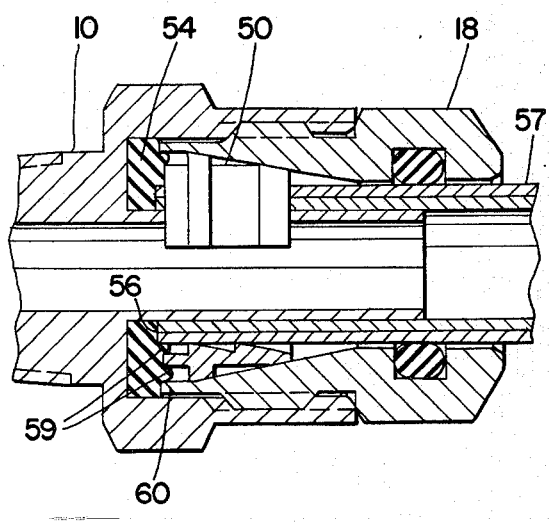
Figure 5:
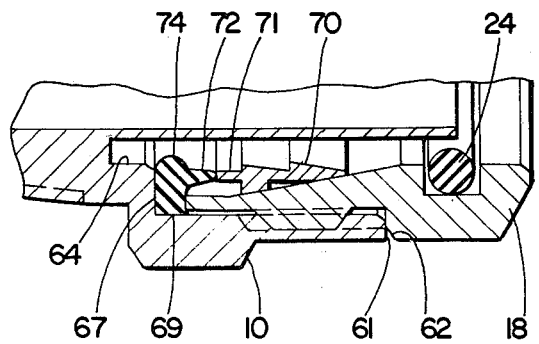
Figure 5A:
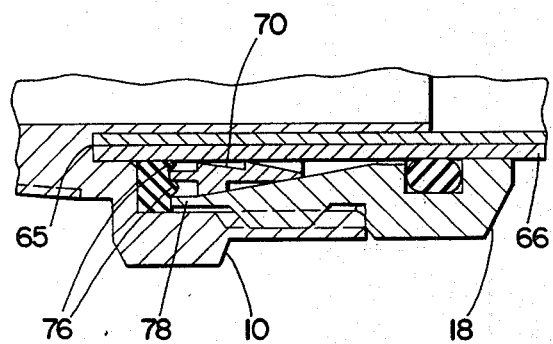

Two other embodiments of the invention are depicted in FIGS. 4–5 and with tubing inserted in FIGS. 4A–5A in which the same reference numerals are used to identify the same or functionally similar parts. Thus, in FIGS. 4 and 4A a similar body 10 and nut 18 configuration are employed, the former having tube support 12 and the latter bearing o-ring 24 with establishment of a metal-to-metal seal between contacting surfaces at 30, 31. In this embodiment of the invention however, a similar gripper 50 includes a somewhat axially longer ridge 51 which abuts axially extending flange 52 of ring sel 54. In this embodiment of the invention, shoulder 55, being the end wall of the body 10 bore, extends fully to tube support 12. Ring seal 54 is of generally rectangular cross-section and substantially fully occupies and is seated against shoulder 55 being compressed again between the inner end of nut 18 and shoulder 55 to provide a body to nut seal. As seen in FIG. 4A the end 56 of inserted tubing 57 abuts a radial face 58 of ring seal 54 to limit the insertion of tubing 57. Radial face 58 is closely adjacent tubing support 12 so as to assure engagement by the tubing end 56 and it will be understood that when the tubing 57 is inserted compression of ring seal 54 will occur thereby increasing the sealing effectiveness between the body 10 and nut 18 as well as increasing the return force provided by axial flange 52 upon gripper 50. As seen in FIG. 4A flange 52 has been substantially compressed upon insertion of tubing 57.

In this embodiment of the invention again a fluid seal is provided by ring seal 54 between body 10 and nut 18 with a metal-to-metal backup seal being provided at surfaces 30, 31 and a secondary fluid seal provided by o-ring 24. Fluid sealing occurs at tubing end 56 in engagement with seal 54, this type of seal, however, being more subject to end movement of tubing 57. It should be noted that as flange 52 of ring seal 54 is compressed by gripper 50 and force exerted upon the seal 54 by the end 56 of the inserted tubing 57, considerable bulging or deformation of seal 54 occurs at the inner and outer radial margins of ridge 51, these bulges 59 enhancing the sealing effect between ring seal 54, inserted tubing 57 and the inner margin of nut 18.

Another embodiment of the invention is depicted in FIGS. 5 and 5A in which again a body 10 and nut 18 are threadedly engaged, the respective surfaces 61, 62 being configured to provide a metal-to-metal fluid seal therebetween. In this embodiment of the invention a recess 64 is again provided in the bottom of the main bore of body 10 for receipt of the end 65 of inserted tubing 66 in a manner to that described with respect to the embodiment of FIGS. 1-3. The shoulder 67 at the bottom of the body bore however is of greater radial extent and supports a ring seal 69 of a different configuration. Gripper 70 includes a relatively long axially extending ridge 71 in abutment with an axially extending flange 72 of ring seal 59, the latter including inner curved surface 74 for sealing on the O.D. of the inserted tubing 66 as seen in FIG. 4A.

Again in this embodiment of the invention ridge 71 of gripper 70 compresses the projecting flange 72 of ring seal 69, and together with the compression of ring seal 69 by the O.D. of inserted tubing 66 against the sealing surface 74, creates bulges 76 in the ring seal at either side of the ridge 71 and in engagement with inserted tubing 66 and the inner edge 78 of the nut 18. In other respects the sealing effects of the components of this embodiment of the invention are very similar to those of the preferred embodiment of FIGS. 1-3 and that embodiment of FIGS. 4-4A.

What is claimed is:

1. A preassembled fitting for tubes wherein a final fluid tight joint may be made solely by insertion of a tube therein, comprising a body having a bore therein and a tubing support forming an annular space for receipt of a tube, said bore having an entrance at one end of said body and terminating at a shoulder of lesser diameter than said bore, a nut having a bore therein for receipt of a tube, said nut having an inwardly extending tubular portion terminating in an end ring of a diameter to fit within said body bore, means for releaseably interengaging said nut and body at a position wherein said end ring of said nut is spaced a short distance from said body shoulder, an elastomeric ring seal in said body member, said ring seal having a first sealing portion disposed between and in direct engagement with said shoulder and said end ring and adapted to be compressed thereby to provide sealing engagement between said body and said nut, said nut further having an internal frusto-conical surface between said bore and said end ring and disposed in said annular space, a radially expandable and contractable sleeve-like gripping member having a frusto-conical outer surface in engagement with said inner surface of said nut and slidable relative thereto, said gripping member having gripping means on the inner surface thereof adapted for engagement with the outer surface of an inserted tube, said ring seal having an abutment portion thereon radially inwardly of said sealing portion, said gripper member having abutment means at the axially inner end thereof adapted for direct engagement with said ring seal abutment portion to limit inward movement of said gripper member and to urge same axially outwardly toward a tube gripping position, an o-ring seal in said nut bore for sealing the outer surface of an inserted tube, and a further tube engaging portion on said ring seal adapted to be compressed by inserted tubing to seal said tube and to increase axial sealing pressure between said nut and body.

2. The coupling set forth in claim 1 further including means forming a further non-resilient seal directly between said body and nut.

3. The coupling set forth in claim 2 wherein said direct seal means comprises a shoulder on said nut engageable by said body entrance in metal-to-metal sealing engagement thereby also to limit interengagement between said body and nut.

4. The coupling set forth in claim 3 wherein said interengaging means comprises mating threaded portions on said body and nut.

5. The coupling set forth in claim 4 wherein said tube engaging portion of said ring seal is an annular surface lying in a plane transverse to the longitudinal axis of said body and nut.

6. The coupling set forth in claim 4 wherein said coupling body further includes a blind bore within said shoulder for receiving an inserted tube, said tube engaging portion of said ring seal being annular and positioned at the entrance of said blind bore to circumferentially engage the outer surface of an inserted tube.

7. The coupling set forth in claim 4 wherein said abutment portion of said ring seal is an axially extending ridge between said tube engaging portion and said first sealing portion of said ring seal, adapted to be compressed upon insertion of said tubing.

8. A push-in type coupling for flexible tubing, comprising first and second body members adapted to be threaded together to form a coupling and to be unthreaded for disconnection, one of said body members having an o-ring seal for sealing the exterior surface of tubing to be coupled thereto and a conical internal surface, a gripper member having a conical outer surface adapted to cooperate with the conical surface of said one body member upon axial movement relative thereto to be radially contracted and expanded over the exterior surface of tubing to be inserted therethrough, for securing and releasing said tubing, an elastomeric seal in sealing engagement between said first and second body members and adapted for direct engagement by said gripper member to bias said gripper member toward said conical surface of said one body member to radially contract said gripper member, said elastomeric seal having an area thereon adapted for compressive engagement by the tubing to be coupled thereto, and a tube support in said second body member extending through said elastomeric seal and said gripper member and terminating at said or-ring seal.

9. The coupling set forth in claim 8 further including a second seal between said body members external of said elastomeric seal.

10. A preassembled push-in fitting for plastic tubing and the like comprising a body member having an axial bore therein, a tubular insert member in said bore, forming with said body member an annular space for receipt of said tubing, said body member having an internal thread extending along a portion of said bore, and an internal shoulder at the inner end of said bore, a nut having an external thread thereon received in said bore, a shoulder on said nut in engagement with said body member for limiting the axial extent of threaded engagement with said body member, an elastomeric seal in said bore in axial compressive engagement with said internal shoulder and with the inner end of said nut thereby forming a seal between said body member and said nut, said seal having a surface thereon engaged by said tubing for sealing said tubing, said nut having an internal annular recess at the outer end thereof, an o-ring seal in said recess for establishing a seal between said nut and said tubing, said nut further having an internal ramp surface of frusto-conical configuration, disposed between said inner end of said nut and said internal recess, and an annular gripper member disposed in said annular space, said gripper member being radially contractible and expandable and having an inner gripping surface dimensioned to receive an inserted length of said tubing in an interference fit, said gripper member having an external ramp surface in mating engagement with said ramp surface of said nut and adapted for relative axial movement with respect thereto, said ramp surfaces oriented with narrow dimensions outwardly so that as said gripper member is moved in an outward direction of said nut, said gripper member is radially contracted, said gripper member being axially movable into direct compressive engagement with said elastomeric seal upon insertion of said tubing so that said gripper member is radially expandable to receive said inserted length of tubing, said gripper member remaining in contact with and being urged by said elastomeric seal in a direction outwardly of said nut toward the narrow end of said ramp surface and toward a radially contracted position, after insertion of said tubing, thereby providing a secure grip on said tubing.

11. The fitting set forth in claim 10 wherein said shoulder on said nut is an external shoulder and abuts said body member in fluid tight engagement to provide a secondary fluid seal.

12. The fitting set forth in claim 10 wherein said tubular insert member extends axially through said elastomeric seal and said gripper member and terminates at said o-ring seal.

* * * * *

UNITED STATES PATENT AND TRADEMARK OFFICE
CERTIFICATE OF CORRECTION

PATENT NO. : 4,335,908
DATED : June 22, 1982
INVENTOR(S) : Donald G. Burge

It is certified that error appears in the above-identified patent and that said Letters Patent is hereby corrected as shown below:

On the title page Insert

-- (73) Assignee: Parker-Hannifin Corporation, Cleveland, Ohio --

Attorney, Agent, or Firm, "Charles W. Chandler" should read -- Joseph B. Balazs --.

Signed and Sealed this

First Day of March 1983

[SEAL]

Attest:

GERALD J. MOSSINGHOFF

Attesting Officer  Commissioner of Patents and Trademarks